March 30, 1954

F. W. SEYBOLD 2,673,611

BACK GAUGE INDICATOR

Filed Aug. 16, 1952

INVENTOR.
FREDERICK W. SEYBOLD

Ostrolenk & Faber
ATTORNEYS

March 30, 1954 F. W. SEYBOLD 2,673,611
BACK GAUGE INDICATOR
Filed Aug. 16, 1952 4 Sheets-Sheet 2

INVENTOR.
FREDERICK W. SEYBOLD
BY Ostrolenk & Faber
ATTORNEYS

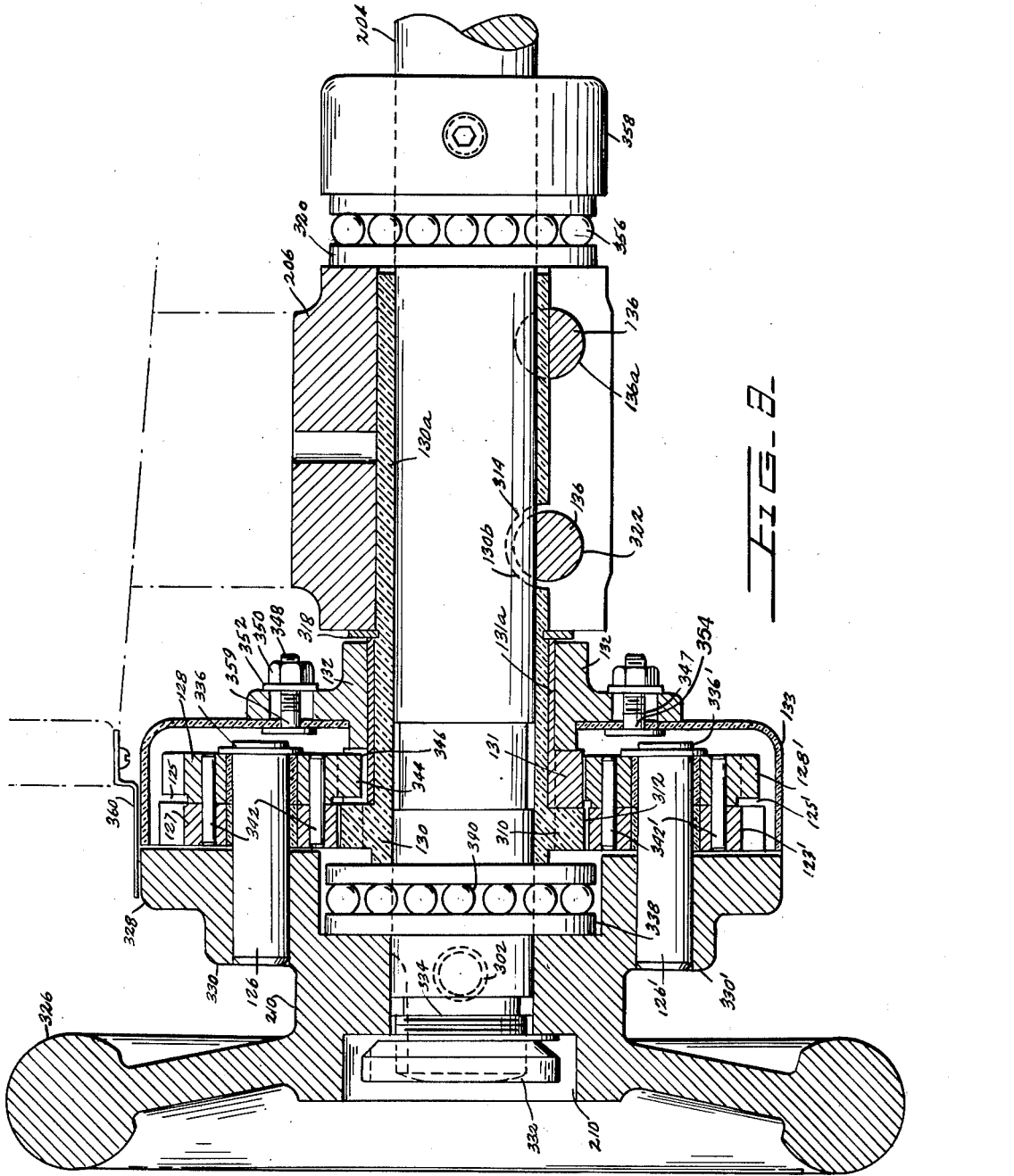

March 30, 1954

F. W. SEYBOLD 2,673,611

BACK GAUGE INDICATOR

Filed Aug. 16, 1952

INVENTOR,
FREDERICK W. SEYBOLD
BY
Ostrolenk & Faber
ATTORNEYS

Patented Mar. 30, 1954

2,673,611

UNITED STATES PATENT OFFICE 2,673,611

BACK GAUGE INDICATOR

Frederick W. Seybold, Westfield, N. J., assignor to E. P. Lawson Co., Inc., New York, N. Y., a corporation of New York Application August 16, 1952, Serial No. 304,703

2 Claims. (Cl. 164—59)

My present invention relates to a cutting device and more particularly it relates to a mechanism for indicating the position of the material to be cut with respect to the cutting knife.

Automatic cutters such as those described in application Serial No. 200,013, filed December 9, 1950, are provided with a gage which moves the paper to be cut by preselected lengths corresponding to the desired dimensions of the finished product.

The dimensions of the finished products may be preselected by means of a stop member moving transversely across the front of the cutting machine in synchronism with the longitudinal motion of the gage.

The stop member moves on a bar with markings in inches or fraction of inches to permit the preposition of stationary stops in accordance with the desired dimensions of the finished product.

The motion of the stop member on the marked bar provides also an indication of the location of the gage with respect to the knife and therefore also a measure of the dimensions of the finished product.

The operator may check the position of the back gage by just reading the markings on the bar indicated by a finger positioned on the movable stop member. This method of indicating the position of the gage presents a shortcoming since when the stop member is far to the left or right of its center position, it becomes difficult for the operator to read the position of the indicating finger of the stop member on the marked ruler when the operator is standing at his normal central position.

My present invention overcomes this problem by providing a second indicator which allows the operator to determine the position of the gage to a degree of precision of 1/64 of an inch.

Accordingly, the main object of my present invention is a device for indicating accurately the position of the back gage in a cutting machine.

A more specific object of my present invention is a device to provide a visual indication of the position of the back gage in a cutting machine during the longitudinal movement of the back gage from one end to the other of the cutting table.

Another object of my present invention is a visual indicator of the position of the back gage in a cutting machine visible and accessible to the operator at all times.

In paper cutting machines like the one described in the above mentioned application, the operator may move the paper to be cut by means of a hand wheel which is connected to the back gage. The connection is such that one revolution of the hand wheel may, for example, correspond to a one inch longitudinal movement of the back gage.

In my invention, the hand wheel or a member rigidly connected to the hand wheel is shaped circularly and provided with 64 divisions, each division corresponding to 1/64 of an inch motion of the back gage so that a reading may be obtained in cooperation with the stationary indicating finger.

A shaft connected to the hand wheel and rotatable with the hand wheel is provided with a gear reduction mechanism. It is then also possible to have a second member, one rotation of which corresponds to the complete longitudinal travel of the back gage. Therefore, when the complete travel of the back gage is 76 inches, one rotation of this second circular member will correspond to 76 inches. This second circular member can thus be provided with 76 indicia correctly separated so that the angular motion from one of these indicia to the next will correspond to a one inch travel of the back gage.

The exact position of the back gage may then be read on the two circular members in cooperation with the stationary indicating finger.

The operator obtains a reading in inches and 1/64 of an inch which accurately informs him as to the position of the back gage and, therefore, as to the longitudinal position of travel of the paper sheets to be cut.

In my present invention I obtain this second indicating device by the addition of a very simple gear system to the existing operating hand wheel of the cutting machine.

Another object of the present invention is, therefore, a back gage indicator requiring very few parts, easy to assemble and of very low cost.

These and other objects of my invention will be apparent from the following description and drawings in which:

Figure 3 is a cross-section of the hand wheel mechanism of the cutter of Figure 1 incorporating my present invention.

Figure 1:
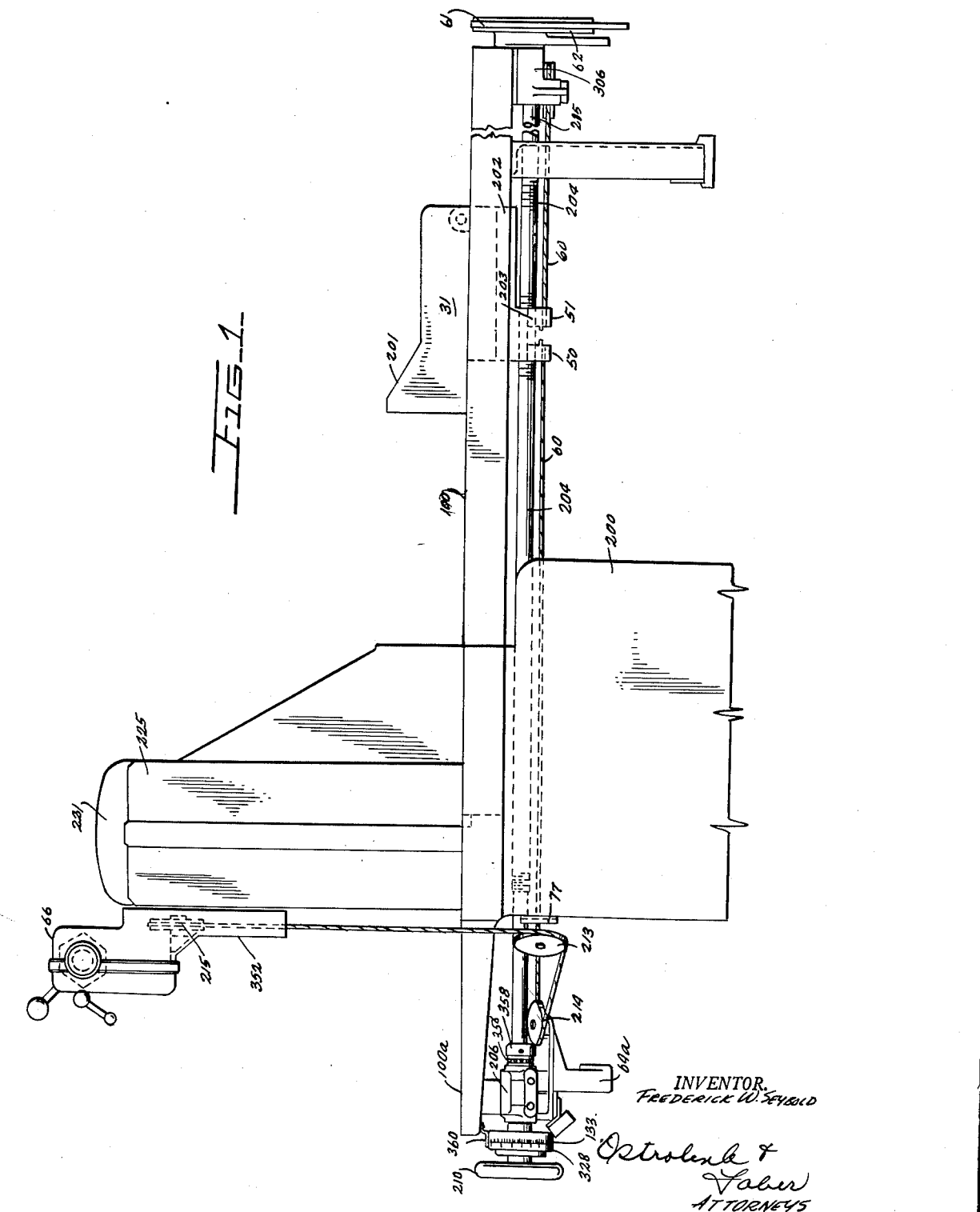
Figure 1 is a side view of the back gage mechanism of a paper cutting device.
Figure 2:
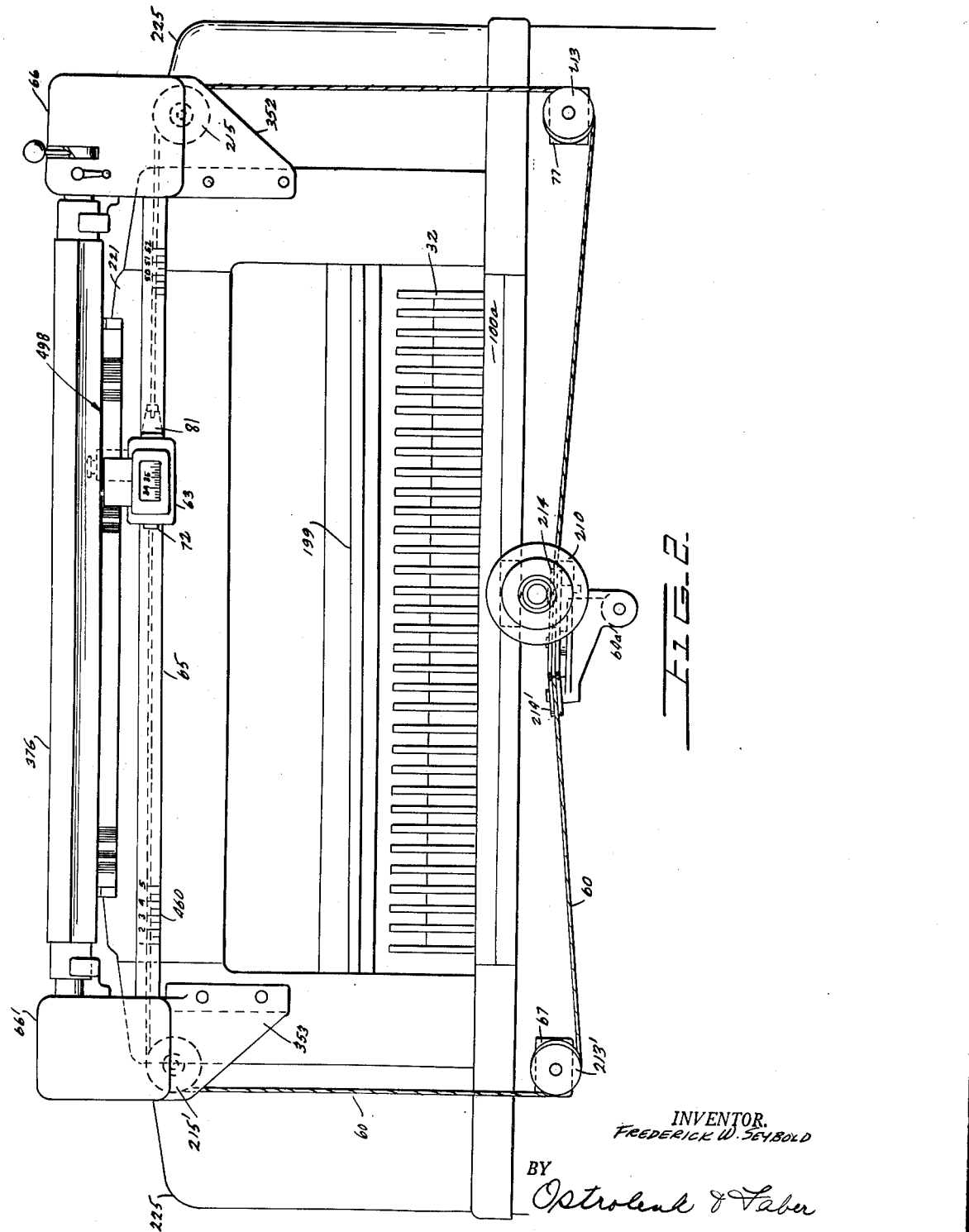
Figure 2 is a front view of the cutter of Figure 1 showing the back gage cable attachment and control carriage of the automatic spacer cutting machine.

Referring to Figures 1 and 2, the cutting machine illustrated is of the type shown in application Serial No. 200,013, filed December 9, 1950. The paper cutting machine therein shown comprises the side frame casings 225 carrying between them the back plate or cutting table 100. The side frame casings 225 extend upwardly and are braced by the cross-bracing member 221. The operating mechanism for the paper cutter is contained within the housing 200 formed by the front and rear plates of housing 200. This housing 200 together with the enclosed portion of the side frame members 225 above the level of the table serves to contain a major portion of the operating mechanism.

The operating mechanism for moving the knife 199 forms no part of the present invention since the present invention relates to the control of the back gage 201 alone and more particularly to a mechanism for directly reading the distance between the front edge of the back gage 201 and the knife 199.

The back gage 201 comprises a metal casting 31 extending across the cutting table 100 and having a plurality of forward extensions 32 (see Figure 2), the aligned front edges of which form the back gage surface. The cutting table 100 is provided with a longitudinal slot through which the bracket 202 of the back gage 201 extends downwardly. The bracket 202 has adjacent its lower end the nut 203 which is in threaded engagement with the back gage feed screw 204.

The back gage operating mechanism is connected by belt 61 at the rear of the cutter to pulley 62 on a shaft extension 205 of the operating screw 204. Operating screw 204 is rotatably carried in a rear bearing bracket 306 and a front bearing at bracket 206 beneath the forward extension 100a of the cutting table 100. The front end of the screw 204 is provided with a hand wheel 210 for manual rotation of the screw 204. The screw 204 is so mounted that while it may rotate freely, it can have no longitudinal movement. Accordingly, rotation of screw 204 either by the operating mechanism driving the belt 61 or by hand wheel 210 will result in corresponding longitudinal movement of the back gage 201 in accordance with the sense of rotation of the screw 204.

The back gage guide bracket 202 is provided with a forward lug 50 and a rear lug 51. A cable 60 is secured at one end to the lug 50 and at the other end to the lug 51. From the lug 50, the cable 60 passes horizontally over the sheave 214, the sheave 214 being mounted for rotation on bracket 64a supported from the underside of the forward table extension 100a. The cable 60 then passes to the vertical sheave 213 mounted on bracket 77 of housing 200. The cable then continues up to the vertical sheave 215 mounted at the upper portion of carriage supporting bracket 352 and then is connected to the connecting lug 81 of the carriage 63. The cable 60 from the lug 51 passes horizontally rearward over the horizontal guide roller (not shown) fastened on a bracket at the rear of the underside of table 100.

This portion of the cable 60 then passes over the horizontal sheave 214' on bracket 64a then to the vertical sheave 213' on bracket 67 at the front end of the machine. The cable 60 passes then to the vertical sheave 215' secured to the side frame casing 353 and then to the lug 72 on the carriage 63.

Carriage 63 is a stop member device and is mounted for slidable movement along the rectangular bar 65 carried between the indicator support brackets 66 and 66' and co-operating with the transparent plastic strip 498 on the bar 376. The carriage 63 thus duplicates exactly the movement of the back gage 201.

The length of each movement of the carriage 63 corresponds exactly to the length of each movement of the back gage 201. The carriage 63 co-operates with the horizontal scale 460 which is equal in length to the maximum path of movement of the back gage 201 and may be marked off with appropriate indicia in inches to give the exact distance of the front face 32 of back gage 201 from the cutting knife 199.

Carriage 63 carries a photo tube (not shown) and a light source (also not shown) as described in the above mentioned application. The photo tube serves to control the hydraulic system driving the back gage 201 and, as shown in the above application, to permit in conjunction with stops the presetting of the step by step movements of the back gage 201 for each pile of paper sheets.

Briefly summarizing the apparatus so far in terms of operation, the carriage 63 travels transversely along the bar 64 in unison with longitudinal travel of the back gage 201. The carriage 63 is provided with photo-electric devices which cooperate with preset stops to control driving means of the back gage 63. Thus, the indicia on scale 460 permit the pre-positioning of the stop means at the beginning of the cutting operation.

In previous cutting devices, the carriage 63 and the scale 460 also serve to give indications to the operator as to the position of the back gage but it was found that when carriage 63 is far to the left or right of its center position, it becomes difficult for the operator to read the position of the indicating finger carried by carriage 63 relative to the scale 460 when he is standing at his normal operating position.

In my present invention, I provide a separate indicator visible to the operator at all times during the operation of the cutting machine.

Figure 4:
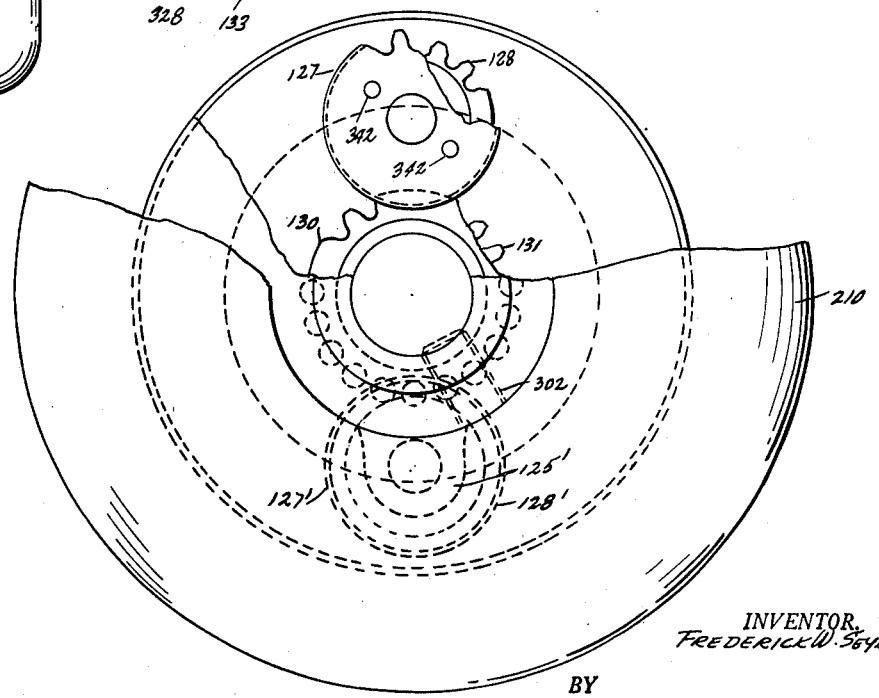
Figure 4 is a partly exploded view of the gear mechanism of my novel indicator.

The indicator (Figures 3, 4 and 5) is located immediately behind the hand wheel 210. The hand wheel 210 having an outside portion thereof graduated (Figure 5) is secured directly to the long lead screw 204 by means of three set screws 302. The back gage 201 is provided with a nut 203 into which the lead screw 204 is threaded.

The bracket 206 serves as the front bearing of the lead screw 204 and a similar bearing 306 is provided at the other end of the lead screw to support the lead screw. Both bearings are fastened by screws 308 to the underside of table 100. Therefore, by turning the hand wheel 210 by hand or power, the back gage 201 may be made to move forward or away from the knife 199.

The lead screw 204 is such that one revolution of the screw 204 will move the back gage 201 one inch. If the total travel of the back gage is 76 inches, then the wheel 210 will make 76 revolutions in order to move the back gage 201 the full distance to the knife edge.

The correct transmission ratio of the gear mechanism illustrated in Figure 3 is obtained by means of planetary gearing in which sun gear member 130 is fixed and two compound planetary pinions 125 and 125' carried by the hand wheel 210 planet around said fixed gear 130, thereby imparting a reduced speed to the gear 131 to which a graduated wheel 133 is attached. The compound planetary pinions 125 and 125' are composed of the pinions 127 and 128 and the pinions 127' and 128', respectively. The planetary gears 127 and 128 are rigidly fastened together by the pins 342. Thus, as the gear 127 rotates, the gear 128 also rotates at the same rotational speed.

The gear 130, which functions as a sun gear, is provided with a long sleeve extension 130a which fits into the bore of bracket 206.

When the stud 136 passing through a hole 136a in bracket 206 is tightened by means of a nut (not shown) the stud 136 is pulled sideways such that a portion of a circular depression of the stud is tightly pressed against the sleeve, thus preventing it from turning.

A snap ring 318 is attached to the sleeve in order to transmit rearward thrust from the front thrust bearing 320 to the bracket 206.

The sleeve 130a also serves as a bearing for the lead screw 204. In order to be able to lock the screw 204, a pocket or recess 130b is provided on the sleeve 130a so that a clamp stud 322 having a circular depression similar to that of stud 136 but shallower may contact the lead screw 204 and clamp it when the stud 322 is pulled sideways by a nut (not shown). The stud 322 extends through the hole 324 in the bracket 206 parallel to the stud 136.

The lead screw 204 extends through a recessed portion of the hub of the hand wheel 210. A nut 332 is mounted on the threaded end 334 of the screw 204 and serves a purpose to be described later.

The hand wheel 210 bears on the race 338 of the thrust bearing 340 to reduce the friction and absorb the thrust between the hand wheel 210 and the face of the stationary sun gear 130. As the hand wheel 210 is rotated, the planetary gears 127 and 128 are rotated correspondingly, being journalled on the stud 126. The snap ring 336 at the end of the stud 126 maintains the planetary pinions 127 and 128 in place.

Compound planetary pinion 125' is similar in operation to compound planetary pinions 125, corresponding parts of which are designated by the same reference numbers as in pinions 125 but with prime designations added.

The teeth 344 of the gear 128 are in interlocking engagement with the teeth 346 of the gear 131. The gear 131 rotates around the sleeve 130a, the motion being transmitted from the hand wheel 210 through the planetary rotation of the gear 127 and gear 128 to the gear 131.

The sleeve portion 131a of the gear 131 is rigidly connected to the hub 132. The hub 132 has four equally spaced holes 347 through which four bolts 348 pass, attaching the graduated wheel 133 to the hub 132. The bolts 348 are tightened in position by the nuts 350 and the washers 352. The bolts 348 pass through holes 354 in the graduated wheel 133.

The outer periphery of the graduated wheel 133 is graduated from one to seventy-six inches, the distance between the back gage 201 and the knife 199.

The diameter of the bolt 348 is nearly the same diameter as the holes 354, however, the holes 347 in the hub 132 having a diameter nearly twice the diameter of belt 348. The purpose of this is to allow a certain amount of adjustment of the graduated wheel 133 with respect to the hub 132 so that the graduated wheel 133 may be properly aligned to accurately indicate the distance between the back gage 201 and the knife 199.

Therefore, as the gear 128 rotates, it turns the gear 131. The sleeve 131a, directly attached to the hub 132, turns accordingly, thus turning the graduated wheel 133 attached to the hub 132 at the same speed as the gear 131.

The lock nut 332 on the front end of screw 204 is set up snugly so that there is no lateral movement of the lead screw 204 between the thrust bearing 340 and the thrust bearing 356 at the other side of bracket 206. The collar 358 which is rigidly fastened to the lead screw 204 confines all of the members on the screw 204 and the nut 332 on the threads 334 is tightened only to the extent of eliminating all lateral motion of the screw 204 but still permits its free rotation in its bearing 130a.

Figure 5:
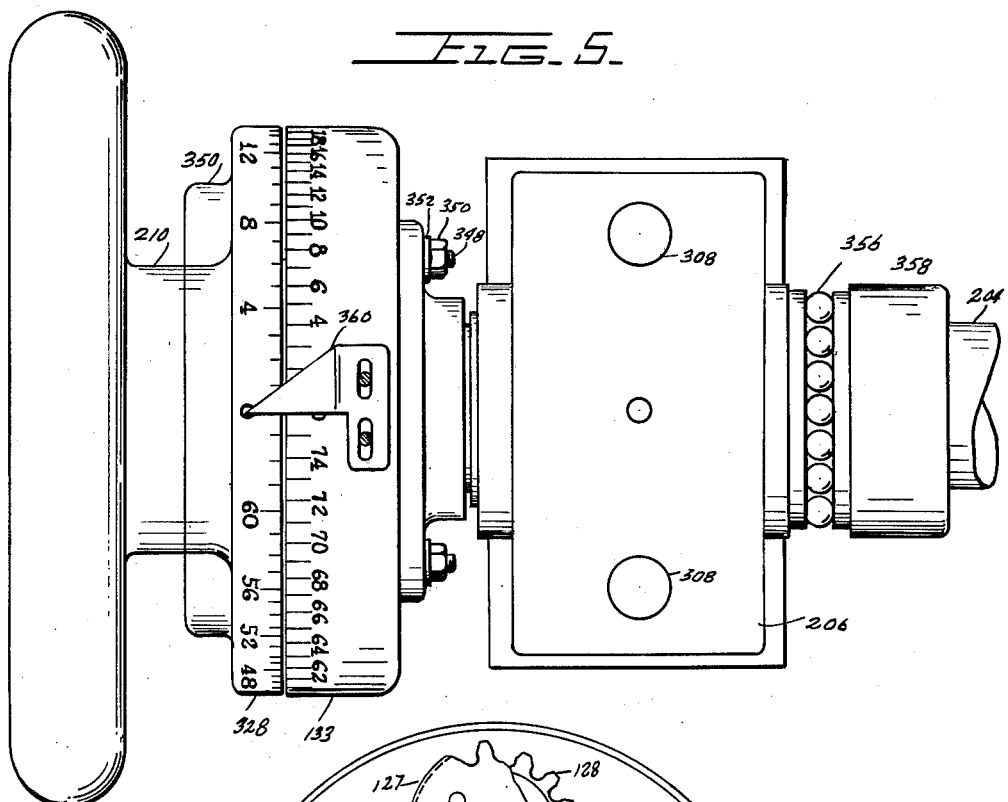
Figure 5 is a top view of my novel indicator.

An indicating finger 360 attached to the bottom of the table 100 is in close juxtaposition to both the graduated wheel 133 and the graduated portion of the hand wheel 210 (see Figure 5).

The gears are selected in order to have a ratio such that the graduated wheel 133 will be turned $\frac{1}{76}$ of a revolution for each complete revolution of the hand wheel 210.

For example, if the total movement of the back gage is 76 inches and the pitch of the thread on the lead screw is such that one revolution will result in the movement of one inch of the back gage, then the desired ratio between the turning of the hand wheel and the turning of the graduated wheel would be one to seventy six. Therefore, if the hand wheel were turned through seventy-six revolutions the graduated wheel would turn through one revolution.

It follows then that if the graduated wheel is calibrated in terms of inches from one to seventy-six and if the hand wheel is graduated in fractions of an inch, for example sixty-fourths of an inch, then the operator by reading the scale beneath the indicating finger 360 will be able to tell the exact distance moved by the back gage with respect to the knife edge to at least $\frac{1}{64}$ of an inch.

To give a seventy-six to one transmission ratio, the gears 127, 128, 130 and 131 are chosen in the following manner:

Planetary gear 127, 16 teeth.
Planetary gear 128, 15 teeth.
Fixed sun gear 130, 20 teeth
Graduated wheel gear 131, 19 teeth.

This choice of gears will result in a transmission ratio of seventy-six to one, the hand wheel making seventy-six revolutions for each single revolution of the graduated wheel gear.

If one rotation of hand wheel 210 produces a longitudinal movement of the back gage 201 of one inch, the cylindrical portion 328 of the hand wheel 210 may be provided with sixty-four markings, the distance between two adjacent markings corresponding to $\frac{1}{64}$ of an inch.

If then the length of the paper sheet is seventy-six inches, the gear ratio for coarse member 133 may be chosen so that each rotation of hand wheel 210 corresponding to one inch movement of back gage 201 causes member 133 to rotate by $\frac{1}{76}$ of 360° or approximately 4.74°. In this case then seventy-six markings are made on member 133, the position between two adjacent markings being 4.74° and corresponding to one inch movement of back gage 201.

In the foregoing I have described my invention only in connection with preferred specific embodiments and applications thereof. Many variations and modifications of the principles of my invention within the scope of the description herein are obvious. Accordingly, I prefer to be bound not by the specific disclosure herein but only by the appended claims.

I claim:

1. In a cutting machine having a knife, a horizontal table, the knife operating to a predetermined cutting position on said table, a back gage movable on said table toward and away from said cutting position, apparatus for moving said back gage, said apparatus comprising a hand wheel, screw means coupling said hand wheel to said back gage so that rotation of said hand wheel causes longitudinal motion of said back gage, a device for visually indicating the position of said back gage comprising a marked cylindrical member rigidly rotatable with said hand wheel and a gear system operated by said hand wheel, said gear system comprising a first sun gear fixedly mounted on said machine and surrounding as a bearing said screw means, a set of planetary gears at the periphery of said sun gear operated by rotation of said hand wheel and screw means with respect to said first sun gear, a second sun gear engaged by said planetary gears, said gear system having a ratio proportional to the number of rotations of said hand wheel necessary to move said back gage through its complete travel, a second marked cylindrical member secured and rotatable with said second sun gear, an indicating finger fixedly mounted on said cutting machine, said two marked members moving with respect to said indicating finger upon motion of said back gage and providing a visual indication of the position of said back gage, said first sun gear comprising an elongated sleeve surrounding said screw means to serve as said bearing, a bracket fixed to said table rearwardly of said gear system, said sleeve being supported in said bracket, said first sun gear effecting a fixed abutment to prevent axial motion of said screw means.

2. In a cutting machine having a knife, a horizontal table, the knife operating to a predetermined cutting position on said table, a back gage movable on said table toward and away from said cutting position, apparatus for moving said back gage, said apparatus comprising a hand wheel, screw means coupling said hand wheel to said back gage so that rotation of said hand wheel causes longitudinal motion of said back gage, a device for visually indicating the position of said back gage comprising a marked cylindrical member rigidly rotatable with said hand wheel and a planetary gear system operated by said hand wheel, a second marked cylindrical member rotatable by said hand wheel through said gear system, an indicating finger fixedly mounted on said cutting machine, said first and second marked members providing in cooperation with said indicating finger a fine and coarse indication, respectively, of the position of said back gage, said planetary gear system comprising a fixed spur gear having an elongated sleeve extending centrally thereof, a bracket fixed to said table and supporting said sleeve, said screw means being disposed in said sleeve for bearing support therein, and a thrust bearing intermediate said hand wheel and said fixed spur gear and carried on said screw means.

FREDERICK W. SEYBOLD.

References Cited in the file of this patent

UNITED STATES PATENTS

| Number | Name | Date |
|---|---|---|
| 483,935 | Malm | Oct. 4, 1892 |
| 539,502 | Brown | May 21, 1895 |
| 1,235,437 | Chard | July 31, 1917 |
| 1,760,938 | Edgar | June 3, 1930 |
| 1,925,623 | Bernard et al. | Sept. 5, 1933 |
| 2,071,402 | Hazelton | Feb. 23, 1937 |